(12) United States Patent
McClure et al.

(10) Patent No.: US 10,345,905 B2
(45) Date of Patent: Jul. 9, 2019

(54) ELECTRONIC DEVICES WITH DEFORMABLE DISPLAYS

(71) Applicant: Apple Inc., Cupertino, CA (US)

(72) Inventors: Stephen R. McClure, San Francisco, CA (US); Derek W. Wright, San Francisco, CA (US); Paul S. Drzaic, Morgan Hill, CA (US); Soyoung Kim, San Jose, CA (US); Yung-Yu Hsu, San Jose, CA (US); Que Anh S. Nguyen, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/221,033

(22) Filed: Jul. 27, 2016

(65) Prior Publication Data

US 2017/0068318 A1 Mar. 9, 2017

Related U.S. Application Data

(60) Provisional application No. 62/215,634, filed on Sep. 8, 2015.

(51) Int. Cl.
*G06F 3/01* (2006.01)
*G09G 3/36* (2006.01)
(Continued)

(52) U.S. Cl.
CPC ............ *G06F 3/016* (2013.01); *G06F 1/1649* (2013.01); *G06F 1/1652* (2013.01);
(Continued)

(58) Field of Classification Search
CPC .......... G06F 3/014; G06F 3/016; G06F 3/011; G06F 3/0484; G06F 3/0202;
(Continued)

(56) References Cited

U.S. PATENT DOCUMENTS 8,400,410 B2 3/2013 Taylor et al.
8,816,977 B2 8/2014 Rothkopf et al.
(Continued)

FOREIGN PATENT DOCUMENTS

EP 2725471 4/2014
EP 2887187 6/2015
JP 4344965 10/2009

OTHER PUBLICATIONS

Heikenfeld et al., Electrofluidic displays using Young—Laplace transposition of brilliant pigment dispersions, Nature Photonics, Apr. 29, 2009, pp. 292-296.
(Continued)

*Primary Examiner* — Dong Hui Liang
(74) *Attorney, Agent, or Firm* — Treyz Law Group, P.C.; G. Victor Treyz; Kendall W. Abbasi

(57) ABSTRACT

An electronic device may be provided with a housing in which display structures are mounted. Additional input-output devices such as a track pad may also be mounted in the housing. These input-output devices may include components such as touch sensors and force sensors for gathering input from a user. The display structures may include a display such as a flexible organic light-emitting diode display or a liquid crystal display that can present visual information to the user. To provide the user with tactile output, an output device such as a display or track pad may be provided with electroactive polymer structures, electromagnetic actuators, and other tactile output devices. The tactile output devices may provide protrusions, indentations, selectively stiffened and softened areas, and other tactile output for a user.

22 Claims, 15 Drawing Sheets

(51) Int. Cl.
*G06F 3/041* (2006.01)
*G06F 1/16* (2006.01)
*G09G 3/3208* (2016.01)

(52) U.S. Cl.
CPC .......... *G06F 3/0412* (2013.01); *G06F 3/0414* (2013.01); *G09G 3/3208* (2013.01); *G09G 3/36* (2013.01)

(58) Field of Classification Search
CPC ...... G06F 3/03545; G06F 17/18; G06F 7/605; G06F 7/62; G06F 8/54; G06F 9/45529; G06F 3/0412; G06F 1/1652; G06F 2203/04102; H01L 51/0097; H01L 2251/5338; G09G 2380/02
See application file for complete search history.

(56) References Cited

U.S. PATENT DOCUMENTS

| | | | |
|---|---|---|---|
| 8,854,331 B2 | 10/2014 | Heubel et al. | |
| 8,866,641 B2 | 10/2014 | Caine et al. | |
| 2002/0030647 A1* | 3/2002 | Hack | G09G 3/3233 345/82 |
| 2004/0227736 A1* | 11/2004 | Kamrath | G01L 1/142 345/173 |
| 2008/0074400 A1* | 3/2008 | Gettemy | G06F 1/1622 345/173 |
| 2008/0252607 A1* | 10/2008 | De Jong | G06F 3/016 345/173 |
| 2008/0303782 A1* | 12/2008 | Grant | G06F 1/1615 345/156 |
| 2008/0303796 A1 | 12/2008 | Fyke | |
| 2009/0233051 A1* | 9/2009 | Chen | B81C 1/00087 428/156 |
| 2009/0250267 A1* | 10/2009 | Heubel | G06F 3/016 178/18.03 |
| 2010/0177050 A1 | 7/2010 | Heubel et al. | |
| 2010/0317132 A1* | 12/2010 | Rogers | H01L 25/0753 438/27 |
| 2012/0105333 A1 | 5/2012 | Maschmyer et al. | |
| 2012/0126959 A1* | 5/2012 | Zarrabi | B06B 1/0688 340/407.1 |
| 2012/0235935 A1* | 9/2012 | Ciesla | G06F 3/0202 345/173 |
| 2012/0242592 A1* | 9/2012 | Rothkopf | G06F 1/1652 345/173 |
| 2012/0313854 A1 | 12/2012 | Senanayake et al. | |
| 2013/0083496 A1* | 4/2013 | Franklin | G06F 1/1626 361/749 |
| 2013/0176608 A1* | 7/2013 | Brokken | G02B 26/0825 359/224.1 |
| 2013/0286462 A1* | 10/2013 | Yeo | G09G 5/00 359/291 |
| 2013/0328447 A1 | 12/2013 | Park et al. | |
| 2014/0085865 A1 | 3/2014 | Kwak et al. | |
| 2014/0098075 A1 | 4/2014 | Yun et al. | |
| 2014/0104047 A1 | 4/2014 | Bolzamcher et al. | |
| 2015/0091834 A1 | 4/2015 | Johnson | |
| 2016/0154461 A1* | 6/2016 | Kang | G06F 3/016 340/407.2 |
| 2016/0357259 A1* | 12/2016 | Vartanian | G06F 3/016 |
| 2017/0011225 A1* | 1/2017 | Rakshit | G06F 21/6218 |

OTHER PUBLICATIONS

Hagedon et al., Bright e-Paper by transport of ink through a white electrofluidic imaging film, Nature Communications, Nov. 6, 2012, pp. 1-7.

* cited by examiner

ELECTRONIC DEVICES WITH DEFORMABLE DISPLAYS

This application claims the benefit of provisional patent application No. 62/215,634 filed on Sep. 8, 2015, which is hereby incorporated by reference herein in its entirety.

BACKGROUND

This relates generally to electronic devices, and, more particularly, to electronic devices with deformable displays and other deformable components.

Electronic devices often include displays for presenting images to a user. Touch screen displays have touch sensors to gather touch input from a user. Touch input and force input can also be gathered using track pads.

When gathering user input such as touch input, a user's finger or other external object may slide across the surface of a touch screen display or track pad with little or no resistance. This lack of tactile feedback can reduce the ability of the user to accurately supply input to an electronic device.

To provide improved feedback as a user is interacting with a touch screen display, the display may be provided with haptic feedback capabilities. A screen may, for example, be provided with a vibrator. When a user selects an on-screen option, the vibrator may vibrate the display to provide the user with tactile information indicating that the on-screen option has been selected.

Vibrating input-output devices such as displays provide more tactile feedback than devices without vibrators, but cannot provide user with as much tactile feedback as a real-life keyboard or other physical input device. It would therefore be desirable to be able to provide improved haptic feedback arrangements for components such as displays and track pads.

SUMMARY

An electronic device may be provided with a housing in which display structures are mounted. Input-output devices such as a track pad may also be mounted in the housing. The input-output devices may include components such as touch sensors and force sensors for gathering input from a user. Display structures may include a display such as an organic light-emitting diode display, a liquid crystal display, or other display that can present visual information to the user. The display may be a flexible display.

To provide the user with tactile output, an output device such as a display or track pad may be provided with electroactive polymer structures, electromagnetic actuators, and other tactile output devices. The tactile output devices may provide protrusions, indentations, selectively stiffened and softened areas, and other tactile output for a user. A user of a display may, for example, be provided with deformed portions that surround an on-screen option or a highlighted item. The deformed portions provide the user of the touch screen display with tactile feedback as the user is providing touch input to interact with information displayed on the touch screen display.

A tactile output device may be formed on top of a rigid or flexible display. In this type of configuration, a flexible polymer layer or other structures in the tactile output device may be deformed to produce tactile output for a user. In another illustrative configuration, a component such as a flexible display or other flexible layer may overlap a tactile output device. The tactile output device may deform a portion of the flexible display or other overlapping flexible component.

Electroactive polymer actuators or other actuators may be used to automatically open and close a foldable electronic device with a flexible display. Control circuitry may place the device in an open position or a closed position by applying electric fields to the electroactive polymer or by otherwise controlling actuators in the electronic device. The motion of structures in devices without displays may also be controlled using electroactive polymer structures and other actuators. Displays, touch pads, and other components may be selectively deformed and housing structures or other movable structures in a device may be moved using shape memory metal actuators, electromagnetic actuators, microelectromechanical systems devices, fluid-based actuators, electroactive polymer devices, and other actuators.

If desired, a display may be formed from a mesh-shaped polymer substrate having an array of openings. Micro-light-emitting diodes or other light-producing structures may be mounted on the mesh-shaped polymer substrate. Actuators for a tactile output device may be located in the openings. The mesh-shaped substrate, micro-light-emitting diodes, and tactile output device components may be embedded in a flexible polymer layer.

DETAILED DESCRIPTION

Figure 1:
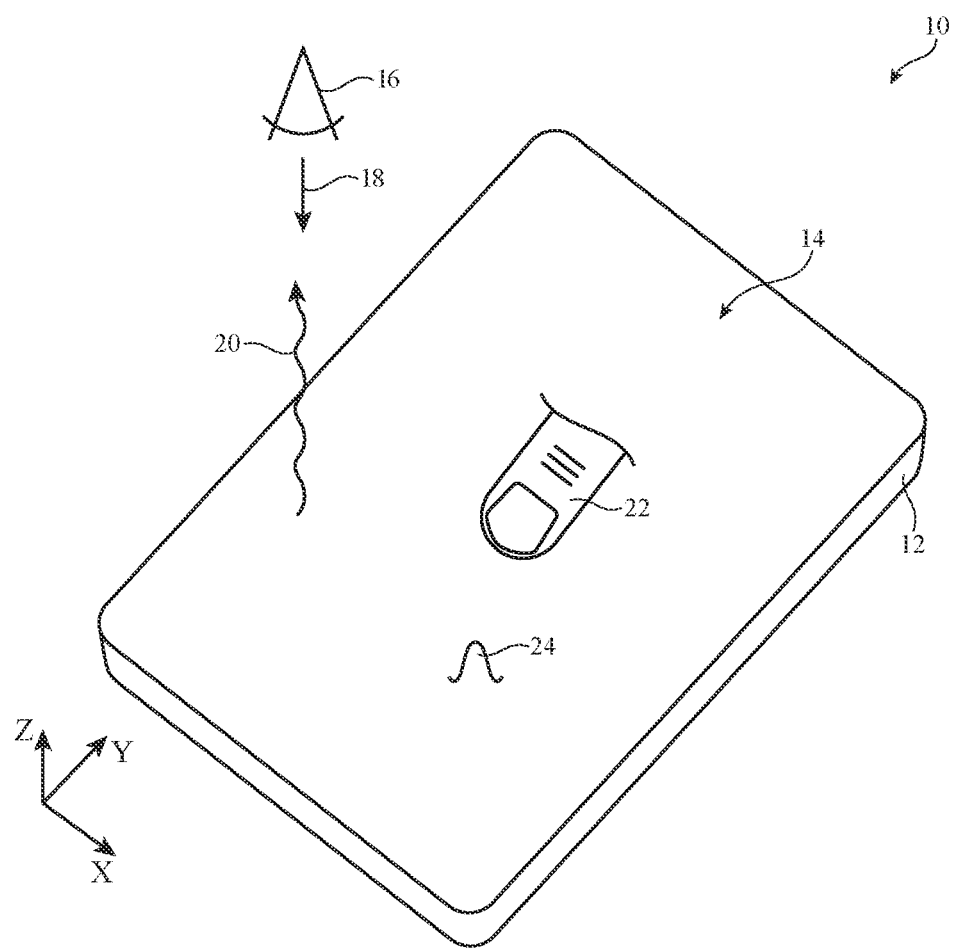
FIG. 1 is a perspective view of an illustrative electronic device in accordance with an embodiment.

An illustrative electronic device of the type that may provide users with tactile output is shown in FIG. 1. In the illustrative configuration of FIG. 1, device 10 is a portable device such as a cellular telephone, media player, tablet computer, watch or other wrist device, or other portable computing device having a touch screen display such as display 14. Other configurations may be used for device 10 if desired. In general, electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive). The touch sensor may be used to gather information on the location of a user's finger such as finger 22 or other external object on the surface of display 14 (i.e., position in lateral dimensions X and Y in the X-Y plane containing the touch sensor and display 14).

Display 14 may include an array of pixels formed from liquid crystal display (LCD) components, an array of electrophoretic pixels, an array of electrowetting pixels, or pixels based on other display technologies. Configurations in which display 14 is a liquid crystal display with a backlight are sometimes described herein as an example. The use of liquid crystal display technology for forming display 14 is merely illustrative. Display 14 may, in general, be formed using any suitable type of pixels. During operation, the pixels of display 14 may emit light 20 in the form of images viewable by user 16 in direction 18.

Tactile output (sometimes referred to as haptic output or haptic feedback) may be supplied through display 14. The tactile output may include vibrations and/or physical deformation and/or local adjustments to the stiffness of a portion of display 14. For example, a portion of display 14 such as portion 24 may be locally deformed. When the user places finger 22 over portion 24, the user may sense the deformation of portion 24. Deformed portion 24 may protrude outwardly from display 14 (e.g., upwardly in the orientation of FIG. 1) to form a protrusion (sometimes referred to as a bump or raised area). If desired, deformed portion 24 may be deformed inwardly (e.g., downwardly in the orientation of FIG. 1) to form a depression (sometimes referred to as a recess, recessed area, or pit). Configurations in which the stiffness of display 14 is locally adjusted (e.g., to create soft compressible areas in a display that is otherwise rigid) may also be used to provide tactile output to a user. Tactile output may be sensed using a stylus, brush, or other inanimate object that contacts display 14 or may be sensed using the tips of the user's fingers or other body parts. Arrangements in which a user's finger such as finger 22 is used in sensing touch output are sometimes described herein as an example.

If desired, tactile output can be provided through surfaces in device 10 that are not associated with display 14 such as a track pad surface, a housing surface, a fabric surface in a cover, case, or bag, a fabric surface in a watch band, a fabric surface or other surface that covers seating or the interior surfaces of a vehicle or room, a surface that covers a portion of a piece of furniture, or other surfaces. Tactile output can be provided by a device that also gathers touch input (e.g., to provide tactile feedback associated with a user's on-screen touch manipulation of an object, menu option, etc.) and/or may be provided on a surface of a device that does not include a touch sensor for gathering touch input (e.g., the inner surface of a watch band, etc.). The surface that provides the user with tactile output may be curved or planar. The use of a planar touch sensitive display 14 to provide tactile output while gathering touch input from a user's finger is merely illustrative.

Figure 2:
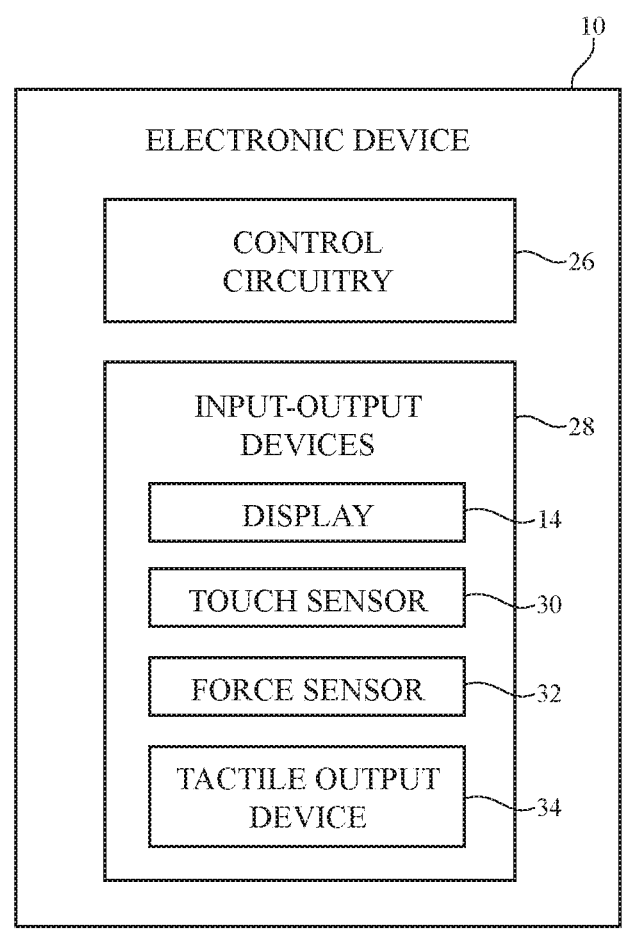
FIG. 2 is a schematic diagram of an illustrative electronic device in accordance with an embodiment.

FIG. 2 is a schematic diagram of device 10. As shown in FIG. 2, electronic device 10 may have control circuitry 26. Control circuitry 26 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 26 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 28 may be used to allow data to be supplied to device 10 and to allow data to be provided from device 10 to external devices. Input-output devices 28 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, etc.), light-emitting diodes and other status indicators, data ports, etc. A user can control the operation of device 10 by supplying commands through input-output devices 28 and may receive status information and other output from device 10 using the output resources of input-output devices 28.

Input-output devices 28 may include one or more displays such as display 14, one or more touch sensors such as touch sensor 30, one or more force sensors such as force sensor 32, and one or more tactile output devices such as tactile output device 34.

Display 14 may have an array of pixels for forming images for viewing by the user of device 10. Display 14 may be an organic light-emitting diode display, a liquid crystal display, an electrowetting display, an electrophoretic display, a microelectromechanical systems (MEMS) shutter display, a plasma display, a micro-light-emitting diode (micro-LED) display based on an array of crystalline semiconductor light-emitting dies, or other suitable display.

Touch sensor 30 may be implemented as part of a track pad, part of display 14 (i.e., a touch screen display), or other portions of device 10. Touch sensor 30 may be a capacitive touch sensor based on an array of capacitive electrodes or may be based on other touch sensor technologies (e.g., resistive touch, force touch, acoustic touch, light-based touch sensor arrangements, etc.).

Force sensor 32 may be integrated with a touch screen display or other display, may be formed as part of a track pad, or may be used in implementing other input components in device 10. Force sensor 32 may be based on a capacitive sensor that senses compression of an elastomeric material, may be based on piezoelectric elements that generate voltage signals in response to compression, may be based on a strain gauge or variable resistor structure, or may use other force sensing components.

Tactile output device 34 may include an a single tactile output element or multiple tactile output elements. Tactile output device 34 may, for example, have an array of tactile output elements that are used to provide a variety of adjustable protrusions, recesses, stiffness variations, vibrations, and other tactile output under the control of control circuitry 26. Tactile output may be provided in response to touch input (e.g., to provide a user who is dragging an on-screen object across display 14 with tactile feedback on the shape and location of the on-screen object, etc.) or may be provided independently of touch input (e.g., as an alert or to form an on-screen physical button or key).

Control circuitry 26 may be used to run software on device 10 such as operating system code and applications. During operation of device 10, the software running on control circuitry 26 may display images on display 14 using an array of pixels in display 14, may gather touch sensor input from touch sensor 30, may gather force input from force sensor 32, and may provide tactile output using tactile output device 34.

Figure 3:
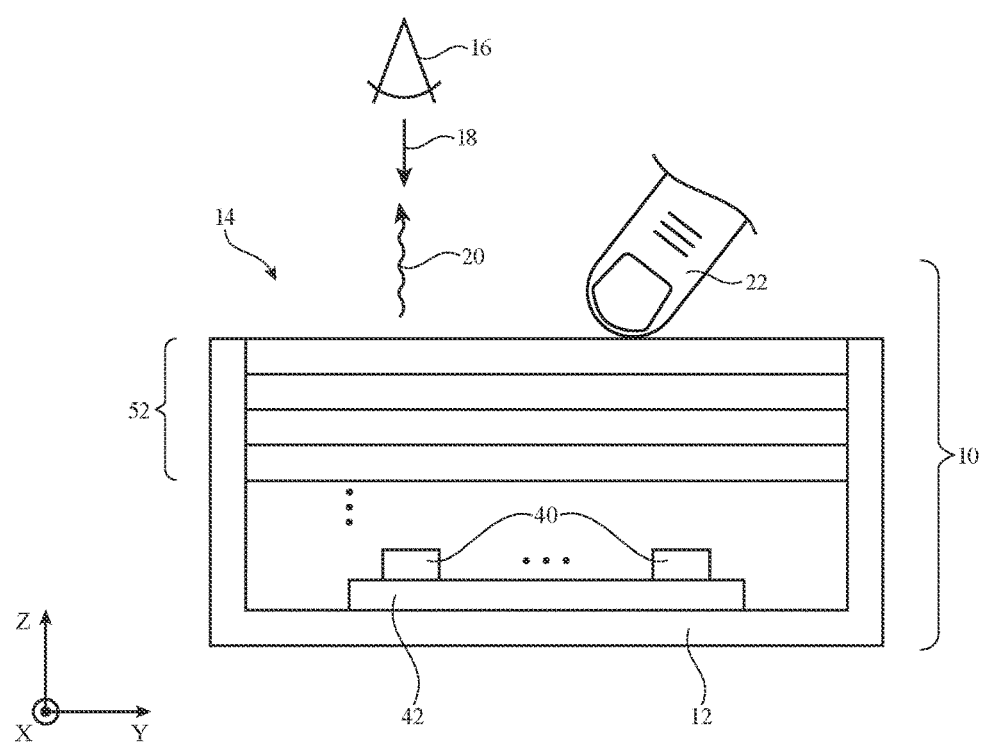
FIG. 3 is a cross-sectional side view of an illustrative electronic device in accordance with an embodiment.

A cross-sectional side view of an illustrative electronic device of the type that may be provided with a tactile output device and other components is shown in FIG. 3. As shown in FIG. 3, electronic device 10 may include a housing such as housing 12. Components such as display 14 may be mounted in device housing 12. Electrical components may be mounted in the interior of device 10. For example, electrical components 40 may be mounted on one or more substrates such as substrate 42. Electrical components 40 may include integrated circuits, sensors, and other circuitry (see, e.g., control circuitry 26 and input-output devices 28 of FIG. 2). Substrate 42 may be a dielectric layer such as a printed circuit layer (e.g., a rigid printed circuit board formed from fiberglass-filled epoxy or other rigid printed circuit board materials or a flexible printed circuit formed from a layer of polyimide or a sheet of other flexible polymer substrate material).

One or more layers 52 on the front face of device 10 or elsewhere in device 10 (e.g., layers such as layers 44, 46, 48, and 50 and, if desired, additional layers) may be used to from components such as a protective cover layer, a pixel array for display 14, circuitry for touch sensor 30 and/and force sensor 32, and/or structures associated with tactile output device 34.

With one illustrative configuration, the outermost layer of layers 52 may be a transparent flexible layer such as a flexible clear polymer layer. Transparent capacitive touch sensor electrodes or other structures for touch sensor 30 may be formed on the underside of the outermost layer or may be formed as part of one or more other layers in layers 52. Structures for forming an array of pixels for display 14 (e.g., an organic light-emitting diode layer, liquid crystal display layers, or other display layers) may be formed under the touch sensor layer or elsewhere in layers 52. If desired, force sensor electrodes (e.g., capacitive force sensor electrode structures) may be supported by one or more of the layers of display 14. Multiple components may also be combined. For example, touch sensor electrodes may be formed as part of a display layer, force sensor electrodes may be omitted or may be formed on a backlight or other structure in a display layer or touch sensor layer, etc.

Tactile output device 34 may be formed using one or more of layers 52. With one illustrative configuration, tactile output device 34 may be located above the pixels of display 14 (i.e., tactile output device 34 may be the outermost of layers 52 or may be located between the outermost of layers 52 and display 14). With another illustrative configuration, display 14 may be located above tactile output device 34 (i.e., the layer or layers that make up display 14 may be the outermost of layers 52 or may be located between the outermost layer of layers 52 and the structures of tactile output device 34).

Figure 4:
FIG. 4 is a cross-sectional side view of an illustrative deformable input device with a touch sensor in accordance with an embodiment.
Figure 5:
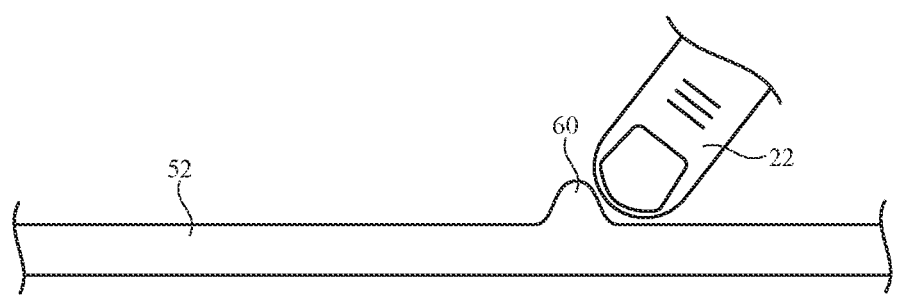
FIG. 5 is a cross-sectional side view of an illustrative deformable input device of the type shown in FIG. 4 in which a portion of the device has been deformed to provide a user with tactile output in accordance with an embodiment.

The operation of tactile output device 34 is illustrated in FIGS. 4 and 5. As shown in FIG. 4, in some configurations, layers 52 may be planar (or curved with a smooth curved surface). In this situation, an external object such as a user's finger 22 may be moved smoothly across the surface of layers 52 without interruption. In other configurations, the control circuitry of device 10 may direct tactile output device 34 to locally deform one or more portions of layers 52 (e.g., to form protrusions and/or depressions). As shown in FIG. 5, for example, tactile output device 34 may generate a locally deformed portion on the surface of layers 52 such as deformed portion 60. When a user moves one or more fingers such as finger 22 (or other external object such as a stylus) across the surface of layers 52, the finger or other object will interact with deformed portion 60. For example, a user's finger may be used to identify locally raised and/or depressed portions of layers 52.

The pattern of deformed portions of layers 52 may be used to form Braille characters, may be used to create button outlines and other on-screen features that help a user locate the boundaries of selectable on-screen options and other displayed content, may be used to create tactile feedback as a user is interacting with a touch sensitive item displayed on layers 52 (e.g., feedback that lets a user know that a drag and drop operation on a particular on-screen item is being performed satisfactorily), may be used to display tactile output associated with a text message or other electronic communication with a remote user, may be used to enhance video content and images, or may be used to provide other tactile output to a user. The tactile output may be supplemental (e.g., to help inform a user of the location of the borders of on-screen items that are already delineated visually) and/or may be used in lieu of displayed image content (e.g., to produce Braille characters for visually impaired users in the absence of any visual output in layers 52).

Figure 6:
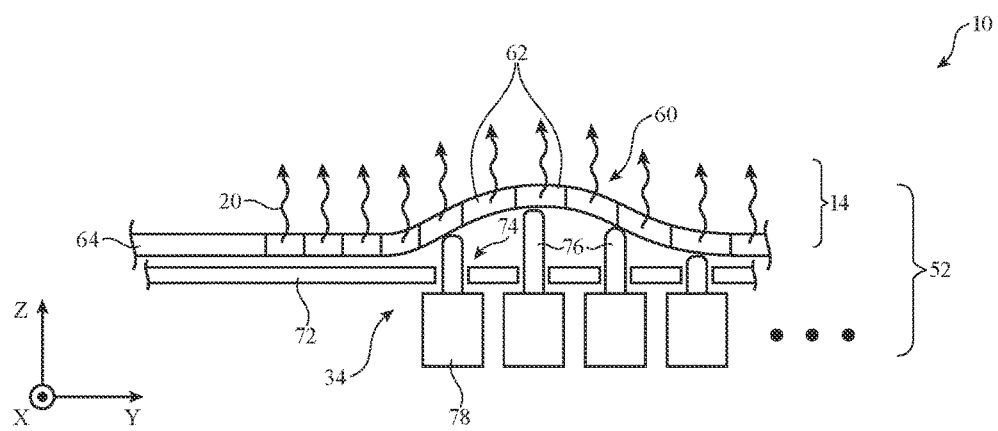
FIG. 6 is a cross-sectional side view of an illustrative deformable display in which a flexible display layer having an array of pixels has been mounted over a layer of tactile output device structures such an array of movable pins in accordance with an embodiment.

FIG. 6 is a cross-sectional side view of a portion of device 10 in an illustrative configuration in which display 14 is formed above tactile output device 34 (i.e., display 14 is located at a more outward location in layers 52 than tactile output device 34). Display 14 is formed from display layer 64. Display layer 64 may include one more sublayers of dielectric material, conductive material, liquid crystal material, emissive material for light-emitting diodes, etc. The structures of display layer 64 may be used to form display pixels 62. Pixels 62 may be used to output light 20 for displaying images for a user. Tactile output device 34 may include structures for locally deforming the surface of layers 52 (e.g., to deform display layer 64 to form a protrusion or other deformed portion 60).

Any suitable electrically controlled devices may be used in deforming layer 64 to form deformed region 60. For example, tactile output device 34 may include electromechanical actuators, materials that deform in response to applied electrical signals (e.g., electroactive polymer, a piezoelectric ceramic, etc.), pressurized fluids (gas and/or liquid), shape memory metals, microelectromechanical systems (MEMS) devices, and/or other structures for forming controlled deformations in layer 64. In the example of FIG. 6, tactile output device 34 has an array of actuators 78. Each actuator 78 controls the vertical position (position along dimension Z) of a corresponding movable member such as one of pins 76 (e.g., an elongated metal member or other elongated structure). Pins 76 may protrude through corresponding openings 74 in a layer such as support layer 72.

During operation, control circuitry 26 may adjust the position of pins 76, thereby creating a deformed portion 60 with a desired profile. Pins 76 need not be extended by the same amount. For example, when it is desired to create a smooth bump on the surface of layers 52, pins 76 that are located near the center of the desired deformed portion 60 may be extended more than pins 76 that are located near the edge of the desired deformed portion 60. In this way, deformed portions 60 with smooth profiles may be generated by tactile output device 34. Other configurations for tactile output device 34 such as configurations in which the positions of movable tactile output device structures 76 are binary (having a single retracted position and a single extended position) may also be used.

Figure 7:
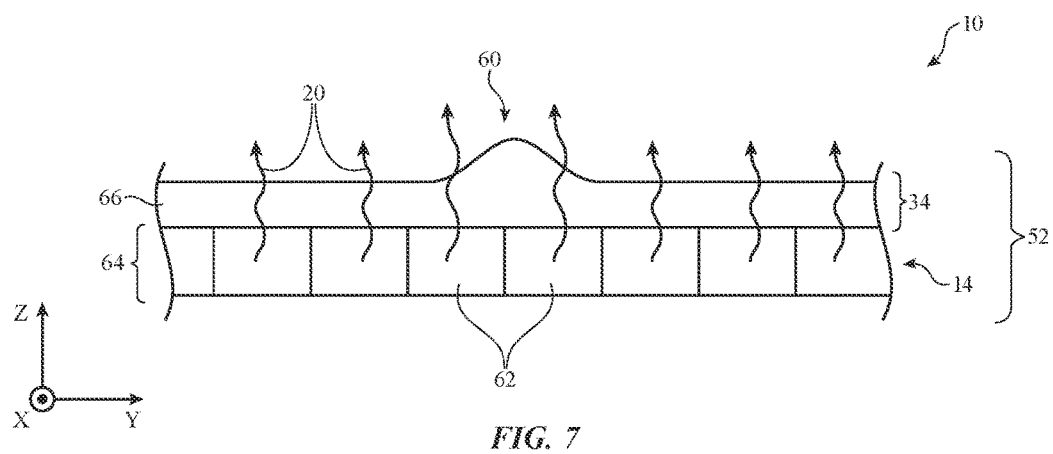
FIG. 7 is a cross-sectional side view of an illustrative deformable display in which a layer of deformable structures for a tactile output device has been mounted over a display layer having an array of pixels in accordance with an embodiment.

As shown in the illustrative configuration of FIG. 7, display 14 may be formed beneath tactile output device 34 (i.e., display layer 64 and pixels 62 may be formed at a more inwardly located position in layers 52 than tactile output device 34). Tactile output device 34 may include structures such as layer 66. Layer 66 may include one or more sublayers of material that can be selectively deformed to form deformed portions such as deformed portion 60. Tactile output device 34 may include materials that deform upon application of electrical signals (e.g., electroactive polymer, a piezoelectric ceramic, etc.), pressurized fluids, shape memory metals, MEMs devices, electromechanical actuators, and/or other structures for forming controlled deformations such as deformed portion 60. Display 14 is formed from display layer 64. Display layer 64 may include one more sublayers of dielectric material, conductive material, liquid crystal material, emissive material, and/or other materials for forming an array of pixels 62. During operation, display 14 may use pixels 62 to emit light 20 to form images for a user and may control the deformation of layer 66 to form localized deformations such as deformed portion 60.

Figure 8:
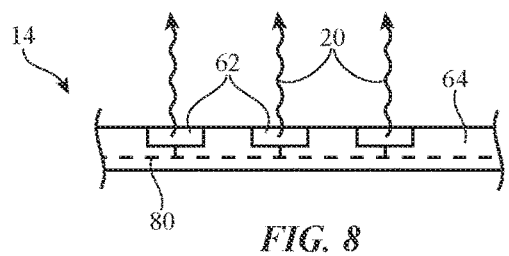
FIG. 8 is a cross-sectional side view of an illustrative display with an array of light-emitting pixels such as a flexible organic light-emitting diode display.

FIG. 8 is a cross sectional side view of display 14 in an illustrative configuration in which display layer 64 contains pixel structures formed from organic light-emitting diodes or other structures embedded in layer 64. Layer 64, which may be flexible, may include a polymer substrate, inorganic buffer layers, metal traces such as metal traces 80, semiconductor regions (e.g., polysilicon, semiconducting oxides such as indium gallium zinc oxide, etc.), polymer planarization layers, encapsulation material, and a circular polarizer to suppress reflections. Pixels 62 may be formed from organic light-emitting diodes.

Figure 9:
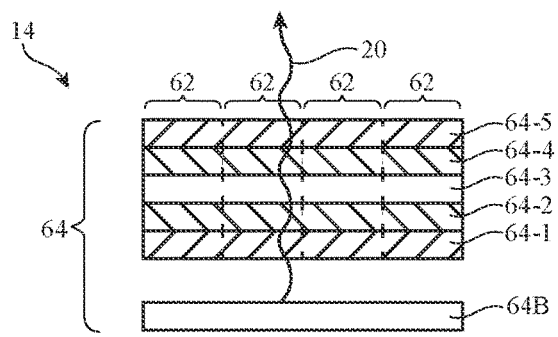
FIG. 9 is a cross-sectional side view of an illustrative display such as a liquid crystal display or other display having an array of backlight pixels in accordance with an embodiment.

FIG. 9 is a cross-sectional side view of display 14 in an illustrative configuration in which display layer 64 is used in implementing a liquid crystal display. As shown in FIG. 9, display 14 may have a backlight unit such as backlight unit 64B. Backlight structures such as backlight unit 64B may include a light guide layer (e.g., a cast polymer light guide plate, a thin flexible light guide film, etc.) that receives light from an array of light-emitting diodes. The light in the light guide layer is scattered upwards by light scattering features in the light guide layer and serves as backlight illumination for an array of pixels 62. Pixels 62 may be formed from layers such as lower polarizer 64-1, upper polarizer 64-5, and liquid crystal layer 64-3. Substrate layer 64-2 may be interposed between lower polarizer 64-1 and liquid crystal layer 64-3. Substrate layer 64-4 may be interposed between upper polarizer 64-5 and liquid crystal layer 64-3. Substrate layer 64-2 may be a thin-film transistor layer having thin-film transistor circuitry for controlling the application of electric fields to pixel-sized portions of liquid crystal layer 64-3. Substrate layer 64-4 may be a color filter layer having an array of color filter elements that provide display 14 with the ability to display color images. If desired, other configurations may be used for forming a liquid crystal display and/or display 14 may be an electrowetting display, electrophoretic display, MEMs shutter display, plasma display, micro-light-emitting diode display, or other display. The configuration of FIG. 9 is merely illustrative.

Figure 10:
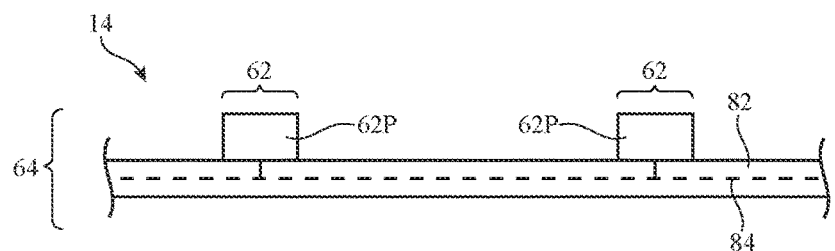
FIG. 10 is a cross-sectional side view of an illustrative display having an array of micro-light-emitting diodes in accordance with an embodiment.

FIG. 10 is a cross-sectional side view of display 14 in an illustrative configuration in which pixels 62 have been formed from individual semiconductor dies forming respective micro-light-emitting diodes 62P (or in which pixels 62 each contain an array of 1-10 micro-light-emitting diode dies mounted on a common interposer to form a multi-light-emitting diode component 62P). Light-emitting diodes 62P may have semiconductor dies that are about 2-15 microns in length and width (as an example). If desired, actuators for tactile output device 34, sensors, and other components may be mounted on the same interposer structure as one or more micro-light-emitting diodes or may otherwise be incorporated into display 14.

Light-emitting diodes 62P may be mounted on a substrate such as substrate 82. Substrate 82 may be a flexible printed circuit substrate (e.g., a polymer sheet such as a flexible layer of polyimide). One or more layers of metal traces such as metal traces 84 may be used to interconnect light-emitting diodes 62P.

Figure 11:
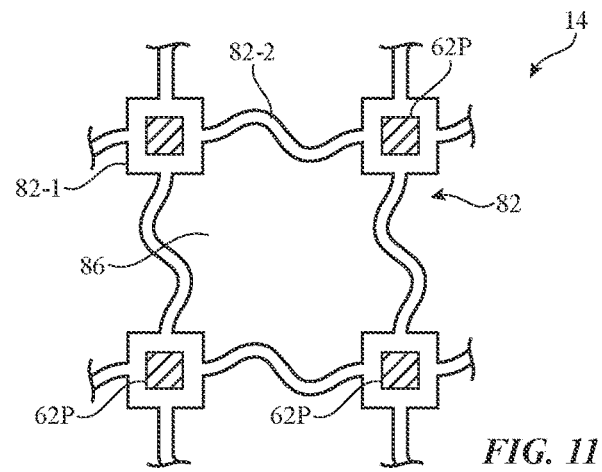
FIG. 11 is a top view of an illustrative display of the type shown in FIG. 10 showing how the display may be provided with a flexible polymer mesh substrate in accordance with an embodiment.

If desired, openings may be formed in substrate 82. The openings may pass partway through substrate 82 or may pass completely through substrate 82. The openings form a mesh-shaped pattern in substrate 82 (e.g., a grid with perpendicular vertical and horizontal portions). As shown in FIG. 11, for example, substrate 82 may have an array of openings such as opening 86 that provide substrate 82 with a rectangular mesh shape. With this shape, substrate 82 includes substrate islands 82-1 (e.g., rectangular islands or islands of other shapes) interconnected by vertical and horizontal substrate segments such as serpentine segments 82-2 or straight substrate segments. The serpentine shape of segments 82-2 may help prevent cracking in metal traces 84 as display 14 is deformed by tactile output device 34 and/or is bent. Other mesh shapes may be used for substrate 82, if desired.

Figure 12:
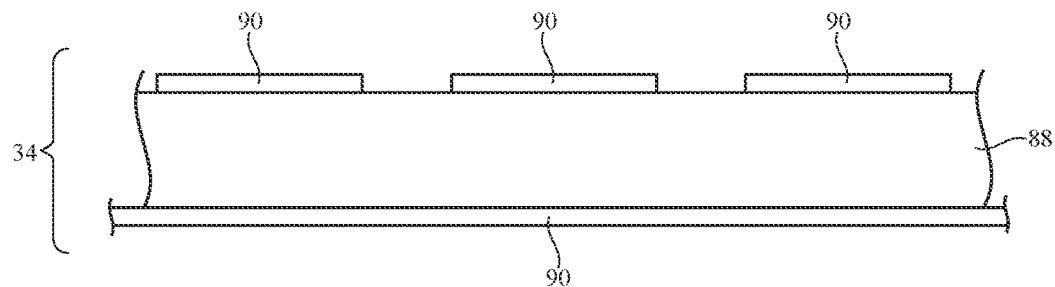
FIG. 12 is a cross-sectional side view of an illustrative deformable layer having an array of electrodes for controlling deformation of the deformable layer in accordance with an embodiment.
Figure 13:
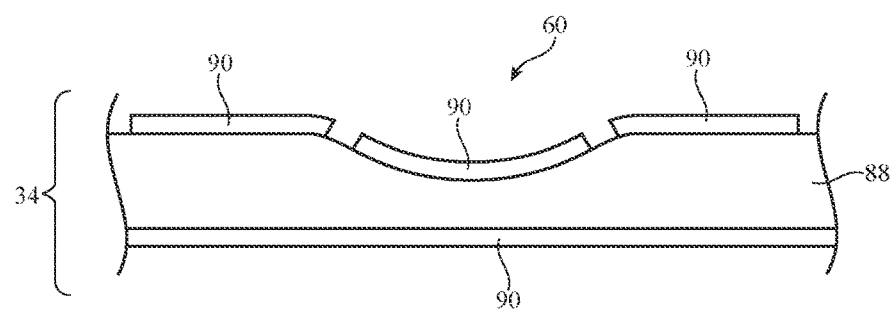
FIG. 13 is a cross-sectional side view of the deformable layer of FIG. 12 in a configuration in which a portion of the deformable layer has been compressed by applying a signal to an electrode in accordance with an embodiment.
Figure 14:
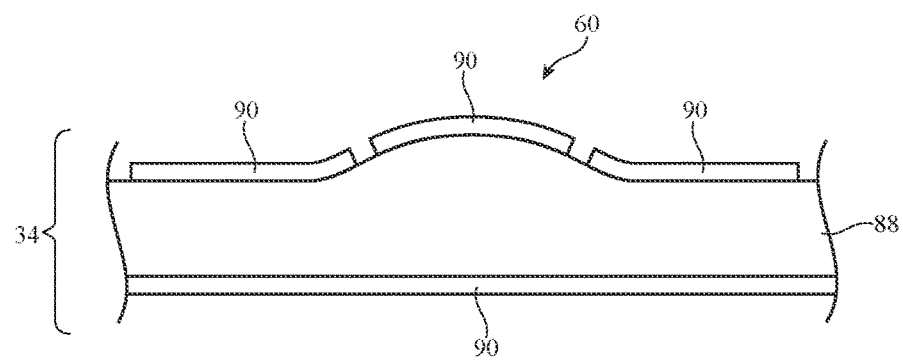
FIG. 14 is a cross-sectional side view of the deformable layer of FIG. 13 in a configuration in which the portion of the deformable layer has been expanded to protrude upwards by application of an appropriate signal in accordance with an embodiment.

An illustrative tactile output device based on electroactive polymer structures or other structures that change size and shape in response to applied electrical signals (e.g., ceramic piezoelectric materials) is shown in FIGS. 12, 13, and 14. As shown in FIG. 12, tactile output device 34 may include a substrate layer formed from a deformable material such as deformable layer 88. Layer 88 may be formed from a polymer (e.g., a solid or foam elastomeric polymer material), a ceramic, or other suitable material. Electrodes 90 may be formed on layer 88. In general, electrodes 90 may be formed on the upper surface of layer 88, may be formed on the lower surface of layer 88, may be embedded in layer 88, and/or may be formed in multiple locations such as these.

Electrodes 90 may be patterned to from an array of rectangular pads, may be patterned to form horizontal and vertical strips (e.g., strips that extend along one dimension on the upper surface of layer 88 and that extend along a perpendicular dimension on the lower surface of layer 88), may be patterned to form blanket layers that cover the entire upper or lower surface of layer 88, and/or may be patterned to form other electrode layouts.

Signals (e.g., alternating-current and/or direct-current signals) may be applied to electrodes 90 to control the local deformation of layer 88. Signals may be applied using vertically aligned electrodes (e.g., to cause layer 88 to deform vertically) and/or may be applied using horizontally offset electrodes (e.g., to cause layer 88 to deform horizontally).

Deformation may results from electrostatic attraction of oppositely charged electrodes (e.g., a positively charged electrode and an adjacent negatively charged electrode), from electrostatic repulsion of commonly charged electrodes (e.g., a pair of positively charged electrodes or a pair of negatively charged electrodes), from ohmic heating, from piezoelectric expansion or contraction (e.g., when a piezoelectric ceramic or electroactive polymer is subjected to an electric field by applying a voltage across a set of adjacent electrodes), or from other types of signal-induced deformation. In the example of FIG. 13, portion 60 of layer 88 has been compressed to form an indented region by application of a signal between the centermost upper electrode 90 and the opposing lower electrode 90 on substrate layer 88. In the example of FIG. 14, the polarity of the applied signal has been reversed so that deformed portion 60 of layer 88 has the shape of a protrusion. In some configurations, layer 88 will have one shape (e.g., a default shape) when no signal is applied and may have a compressed or elongated shape when an alternating-current or direct-current signal is applied. By controlling the signals applied to multiple electrodes 90, patterns of protrusions and/or indentations may be formed in layer 88. Only protrusions may be formed, only indentations may be formed, or both protrusions and indentations may be formed simultaneously.

Figure 15:
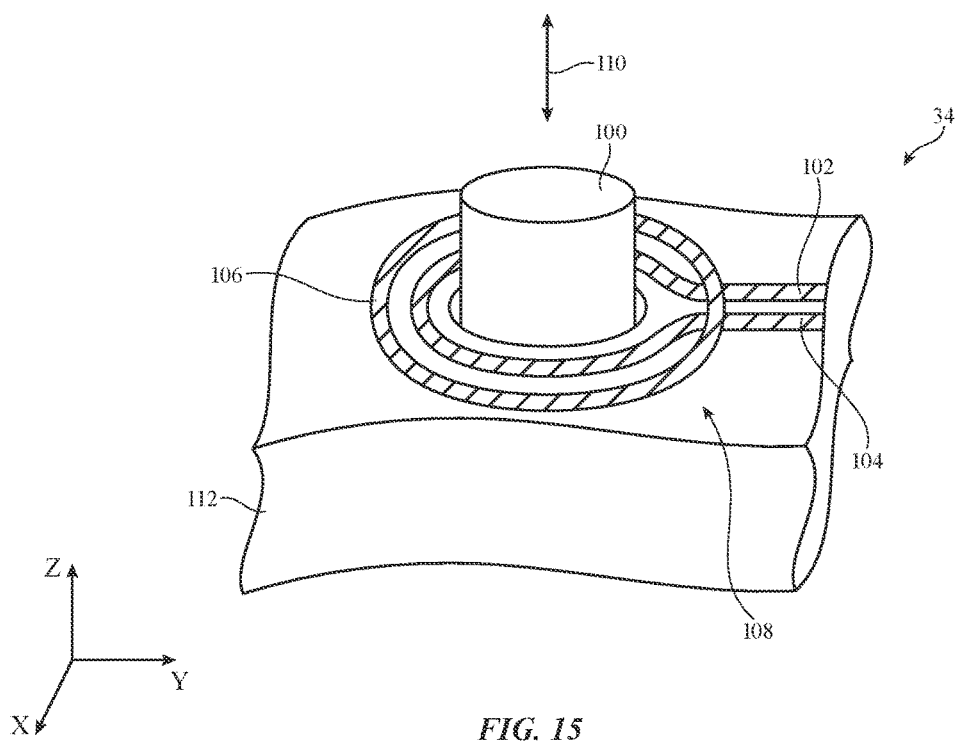
FIG. 15 is a perspective view of an illustrative electromagnetic actuator of the type that may be used to provide a user with tactile output in accordance with an embodiment.

FIG. 15 is a perspective view of tactile output device 34 in an illustrative configuration in which device 34 has an electromagnetic actuator formed from a moving actuator member such as plunger 100. Plunger 100 may be formed from a magnetic material such as a permanent magnet. Plunger 100 may have an elongated shape with a circular cross-sectional shape (i.e., plunger 100 may be cylindrical and may form a pin), may have an elongated shape with straight edges or a combination of straight and curved edges, or may have other suitable shapes. Plungers 100 may be formed from individual pieces of material or may be formed from embossed features in a common layer of material (as examples). Plungers 100 may also be formed from separate magnetic members that are retained in an array pattern within a flexible polymer sheet, fabric, or other flexible substrate layer. If desired, deformable sheets of magnetic material (e.g., ferromagnetic particles in a polymer binder, etc.) may be locally deformed using an array of electromagnetic actuators (e.g., an array of electromagnets), plungers 100 or other movable structures (separate structures or structures formed on a flexible substrate) may be formed using electromagnets in addition to or instead of forming these structures from ferromagnetic material. For example, device 34 may be formed form a flexible array of electromagnets (e.g., coils on a flexible polymer layer) that overlaps a corresponding planar array of electromagnets (e.g., coils on a planar substrate layer). The electromagnets in the flexible array may be directed to repel or attract corresponding electromagnets in the planar array by controlling the current through the electromagnets.

As shown in the example of FIG. 15, metal traces 106 may be formed on a substrate such as substrate 112 (e.g., a single-layer or multi-layer printed circuit, a molded plastic layer, or other suitable support structure). Metal traces 106 may be patterned to form a single-turn or multi-turn loop such as loop 108 surrounding magnetic plunger 100. Loop 108 may have a pair of terminals such as terminals 102 and 104. Current may be applied through loop 108 by applying a voltage across terminals 102 and 104. As current flows through loop 108, a magnetic field is produced in the vicinity of plunger 100 (e.g., a magnetic field that is oriented along the Z dimension of FIG. 15). By varying the strength of the magnetic field by adjusting the signal across terminals 102 and 104, the position of plunger 100 in directions 110 along vertical dimension Z may be controlled to form adjustable deformed portion 60, as described in connection with tactile output device 34 of FIG. 6. Ferromagnetic structures with other shapes may also be controlled using magnetic fields produced from signal path loops such as loop 108. The configuration of FIG. 15 in which a ferromagnetic plunger is being controlled is merely illustrative. If desired, elongated members such as member 100 of FIG. 15, pins 76 of FIG. 6, or other movable structures in device 34 may be controlled using microelectromechanical systems (MEMS) actuators (linear or screw), motors, actuators based on electrostatically driven combs and other electrostatic actuators, or other electrically controllable mechanical actuators. The example of FIG. 15 is merely illustrative.

Figure 16:
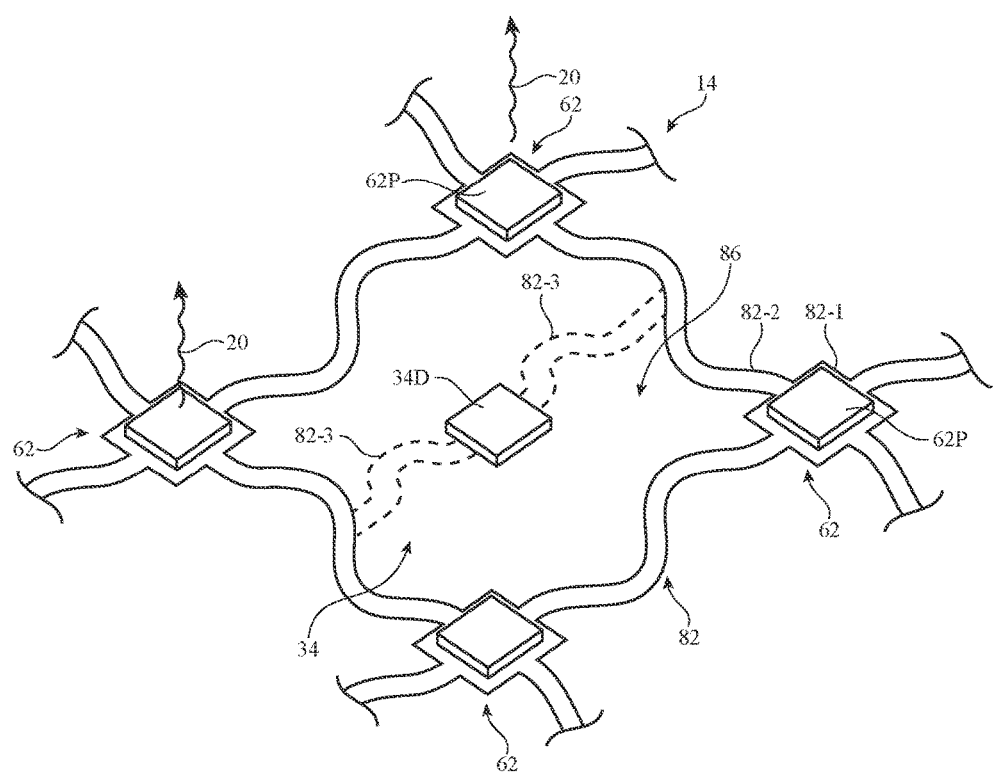
FIG. 16 is a perspective view of an illustrative micro-light-emitting diode array for a display having a mesh shaped substrate and an actuator formed in an opening in the substrate for providing tactile output for a user in accordance with an embodiment.

As shown in FIG. 16, tactile output device components for tactile output device 34 such as illustrative tactile output device component 34D may be located in openings such as opening 86 in a mesh-shaped substrate such as substrate 82. Display 14 may be formed from micro-light-emitting diodes 62P (single diodes or multiple diodes on an interposer) on island portions 82-1 of substrate 82. Substrate 82 may be a layer of polyimide or other flexible polymer layer having metal traces that are soldered or otherwise coupled to diodes 62P.

Segments 82-2 of substrate 82 may have serpentine shapes or other suitable shapes for forming a grid (e.g., a mesh shape with an array of openings 86). Component 34D may be coupled to traces in substrate 82 (e.g., using an island of substrate 82 under actuator 34D and coupled substrate segments such as serpentine segments 82-3) or may be coupled to control circuitry in device 10 using other suitable signal paths. Component 34D may be one of an array of components in device 10 that are used in forming tactile output device 34 and may be based on electromechanical actuators, materials that deform based on applied electrical signals (e.g., electroactive polymer, a piezoelectric ceramic, etc.), pressurized fluids, shape memory metals, and/or other structures for forming controlled deformations in layers 52. The structures of FIG. 16 may be embedded within a flexible polymer layer (e.g., one of layers 52 such as a flexible clear polymer layer that allows light 20 from pixels 62 to be emitted outwardly towards a user and that can be deformed under control of actuators 34D), may be covered with a polymer layer (e.g., a clear deformable sheet of polymer that allows light 20 to pass and that deforms in response to movement of actuators 34D), or may otherwise be incorporated into layers 52.

Figure 17:
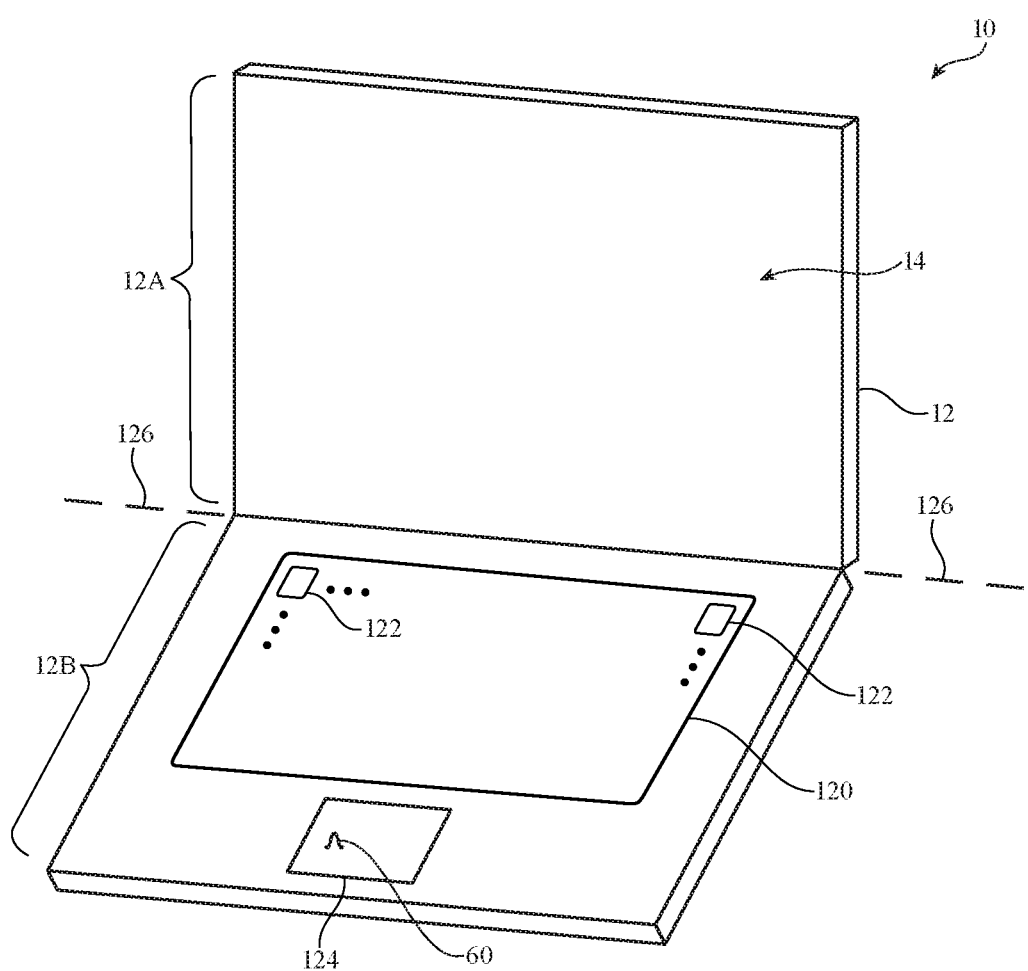
FIG. 17 is a perspective view of an illustrative electronic device having a track pad of the type that may be used to gather touch input and provide a user with tactile output in accordance with an embodiment.

A perspective view of device 10 in an illustrative configuration in which tactile output device 34 does not overlap display 14 is shown in FIG. 17. Device 10 may have a housing such as housing 12 with an upper housing portion such as portion 12A that rotates about hinge axis 126 with respect to a lower housing portion such as portion 12B. Display 14 may be mounted in upper housing 12A. Keyboard 120 and track pad 124 may be mounted in lower housing 12B. Keyboard 122 may have keys 122 (e.g., alphanumeric keys). Track pad 124 may include touch sensor 30, force sensor 32, and/or tactile output device 34. A user may supply touch and force input to track pad 124 to control the operation of device 10. Device 10 may supply tactile output to the user with tactile output device 34. For example, device 10 may deform portions of track pad 124 such as portion 60.

Figure 18:
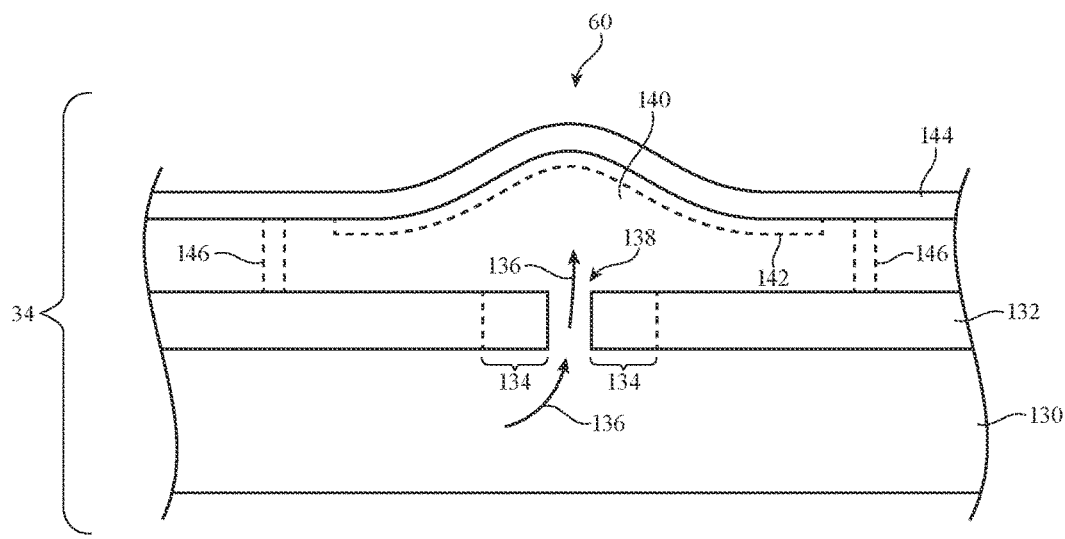
FIG. 18 is a cross-sectional side view of an illustrative fluid-based tactile output device in accordance with an embodiment.

If desired, fluids may be used to control deployment of deformed portion 60 in tactile output device 34 (e.g., a tactile output device mounted in alignment with display 14, track pad 124, or other structures in device 10). This type of arrangement is shown in FIG. 18. In the illustrative configuration of FIG. 18, tactile output device 34 has a fluid reservoir such as reservoir 130. Flexible layer 144 (e.g., a flexible polymer layer) may form the upper surface of device 34. The fluid of reservoir 130 may pass through one or more openings in barrier layer 132 such as opening 138. There may be a single opening 138 associated with each potential location of a deformation in flexible tactile output device outer layer 144 or layer 132 may be a porous membrane with numerous openings 138 associated with each potential location for deformed portion 60.

Fluid may pass through openings such as opening 138 as indicated by arrows 136 in response to control signals from control circuitry 26. The fluid may be a gas (e.g., air, nitrogen, etc.) or may be a liquid such as a charged liquid or may be a ferrofluid (e.g., a ferromagnetic material formed from suspended ferromagnetic particles in a liquid carrier). Electrodes for controlling fluid flow may be mounted in regions such as the inner surface of outer layer 144 (see, e.g., illustrative electrode 142) and regions 134 in barrier layer 132 (e.g., on the upper or lower surface of layer 132, embedded within layer 132, etc.). When a signal is applied to the electrodes, fluid from layer 132 (e.g., electrically charged liquid in reservoir 130) may be drawn into region 140. Lateral barrier structures such as walls 146 may confine the liquid laterally and may cause the liquid to locally push upwards on layer 144, thereby forming deformed portion 60 of layer 144.

If desired, electroactive polymer may be used to form layer 132 and movement in layer 132 that promotes the formation of deformation 60 (e.g., static pressure or a series of pumping motions) may be generated by applying signals to electrodes in regions 134. The applied signals may cause regions 134 to expand vertically and/or horizontally. For example, in scenarios in which electrodes are formed in regions 134, applied signals may draw the electrodes on opposing sides of opening 138 towards each other or may expand and/or contract portions 134 or other portions of layer 132, thereby forcing fluid in region 140 upwards to deform portion 60. When it is desired to restore device 34 to its initial undeformed state, the applied signals can be removed. In ferromagnetic structures, ferromagnetic fluid can be selectively stiffened or caused to protrude outwardly by application of magnetic fields (e.g., by supplying current through coils or other electromagnet structures). In configurations in which device 34 contains ferrofluid (e.g., fluid 130 in regions such as region 140 that is selectively stiffened or returned to its liquid state by application of magnetic fields from coils of signal lines), display 14, track pad 124, and/or other portions of device 10 may be provided with selectively stiffened and softened regions. Ferrofluid-based devices may also be used to create indentations and protrusions. The electrodes in ferrofluid-based devices may have the shape of coils to generate magnetic fields. Manually controlled fluid control structures (e.g., hand operated pumps) and/or one or more electromechanical pumps that are controlled electrically by control circuitry 26 can also be used to adjust the flow of fluid from reservoir 130 upwards to deform portions 60 in flexible layer 144.

Figure 19:
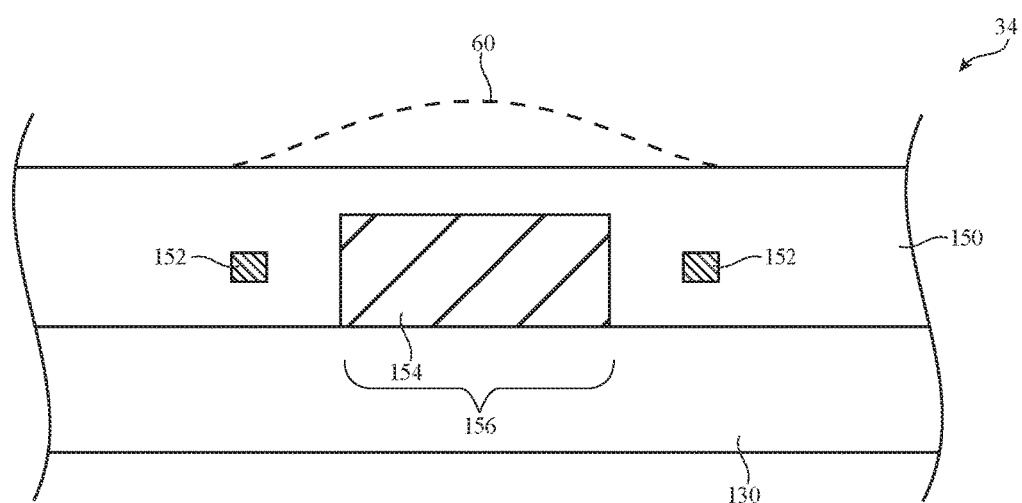
FIG. 19 is a cross-sectional side view of an illustrative tactile output device having a fluid-filled cavity that penetrates partway into a deformable layer such as a flexible polymer layer in accordance with an embodiment.

FIG. 19 is a cross-sectional side view of tactile output device 34 in an illustrative configuration in which flexible output device layer 150 has a recessed portion formed from opening 156 in the lower surface of layer 150. The recess formed by opening 156 passes only partway through layer 150, so that fluid from reservoir 130 may remain confined in region 154 when deforming layer 150 to from deformed region 60. Electrodes 152 may be formed on one of the surfaces of layer 150 and/or may be embedded within layer 150. As with the fluid of device 34 of FIG. 18, the fluid in reservoir 130 may be a charged liquid that responds to applied electrostatic fields, may be an uncharged liquid that can be pumped into region 154 to deform portion 60 using electromechanical actuators, manual pumping, contraction and expansion of actuators formed from electroactive polymers or piezoelectric ceramics, or may be a ferrofluid that can be manipulated by applying magnetic fields.

As an example, electrodes 152 may be configured to form an electromagnet loop around opening 156. When magnetic fields are applied to a ferrofluid in region 154 by applying current to the looped current path formed from electrodes 152, region 154 may be stiffened and/or deformed portion 60 may be formed in layer 150. When the magnetic fields are removed (e.g., by interrupting the flow of current through the electromagnet formed from electrode loop 152), the ferrofluid in region 154 may return to its initial liquid state, thereby softening the portion of layer 150 that overlaps region 154 and/or allowing protruding portion 60 to return to a planar state. If desired, configurations of the type shown in FIG. 19 may have electrically controlled electroactive polymer actuators to create deformed portion 60 or may have other types of actuators. The use of ferrofluids to control deformation 60 and/or the stiffness of layer 150 is merely illustrative.

Figure 20:
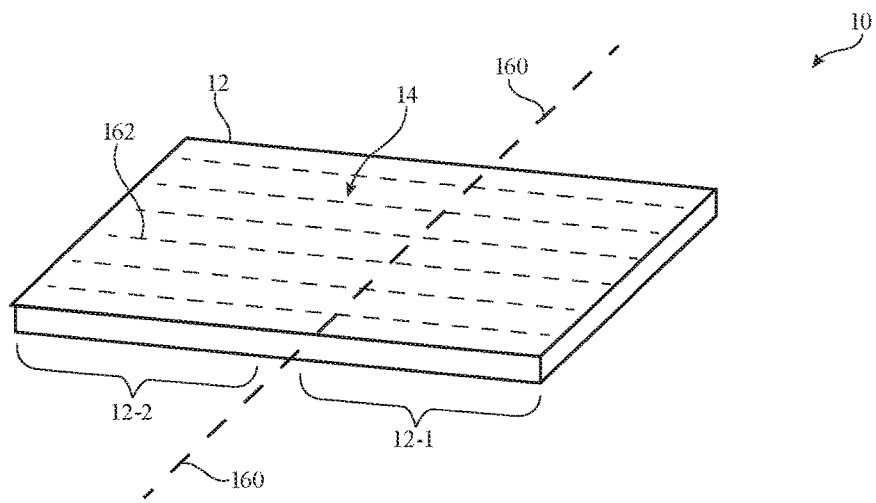
FIG. 20 is a perspective view of an illustrative foldable electronic device in an unfolded (open) configuration in accordance with an embodiment.
Figure 21:
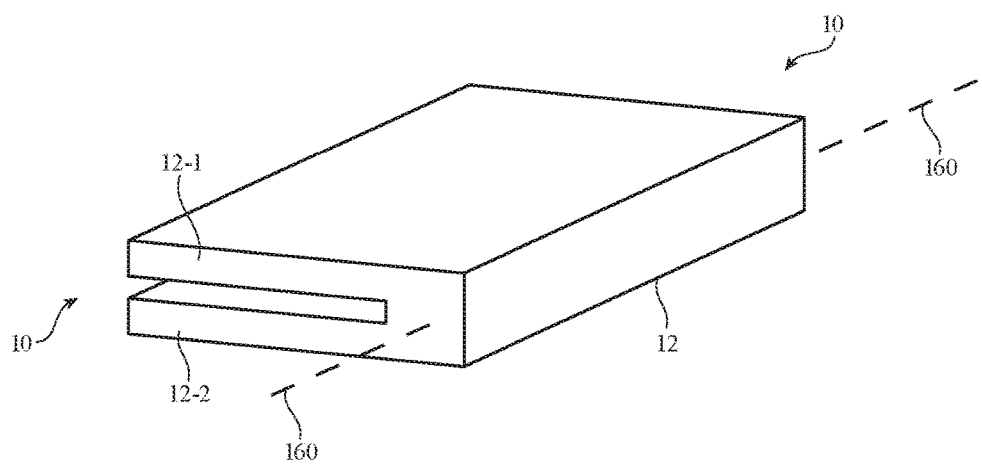
FIG. 21 is a perspective view of the illustrative foldable electronic device of FIG. 20 in a folded (closed) configuration in accordance with an embodiment.

If desired, electroactive polymers, shape memory metal actuators, or other actuators may be used in controlling the shape of housing 12, the movement of housing 12, the movement of components of device 12 mounted in housing 12, the movement of other portions of device 10. Consider, as an example, the illustrative configuration for device 10 of FIGS. 20 and 21. In the example of FIGS. 20 and 21, device 10 has a foldable housing. Foldable housing 12 may have portions such as first portion 12-1 and second portion 12-2. Portions 12-1 and 12-2 may fold on top of each other about bend axis 160, as shown in FIG. 21.

Display 14 may be formed on one of the exposed surfaces of housing 12. As shown in FIG. 20, for example, display 14 may extend from portion 12-1 and 12-2 and may span hinge (bend) axis 160. Metal traces 162 may be patterned to form a grid, overlapping lines, electrode pads, blanket films, and/or other patterns that allow control circuitry 26 to apply electrical signals to actuator structures in device 10. The actuator structures may be formed from electroactive polymer, piezoelectric materials such as piezoelectric ceramic, shape memory metal structures, or other structures that can be used to selectively bend housing 12 and display 14 about axis 160. The electroactive polymer (e.g., a polymer that changes size under applied electric field due to ion migration or other effects), piezoelectric ceramic, shape memory metal, or other actuator structures may be formed from one or more layers in display 14, in touch sensor 30, in force sensor 32, and/or in other layers 52 of device 10.

Using this type of arrangement, control circuitry 26 can open and close housing 12. For example, control circuitry 26 can adjust the signals that are applied to the electroactive polymer actuator structures or other actuator structures in device 10 when it is desired to place housing 12 in the open (flat display) configuration of FIG. 20 and can adjust these signals when it is desired to place housing 12 in the closed (folded and bent) configuration of FIG. 21. The signals can also be adjusted to place housing 12 in intermediate states (e.g., configurations in which the surface normal of housing 12A is oriented at 90° or other intermediate angles with respect to the surface normal of housing 12B—i.e., an angle between 0° and 180°). For example, if housing 12 is in its open state, a signal can be applied to an electroactive polymer layer that spans some or all of the face of housing 12 and display 14 that cause the electroactive polymer layer to contract and thereby cause housing portions 12A and 12B to close upon themselves about hinge axis 160. Other structures in device 10 (e.g., port covers or other movable structures) may also be controlled using electroactive polymer actuators or other electrically controlled actuators. The use of actuators based on electroactive polymer structures to control the relative positions of housing portions 12A and 12B in an electronic device with a foldable housing and foldable display is merely illustrative.

Control circuitry 26 may adjust the shape of housing 12 in response to user input commands or in response to satisfaction of predetermined close and open criteria. For example, housing 12 may be closed or opened (or other movable device structures may be moved) when a predetermined date and/or time has been reached. When an incoming email message, text message, video or voice call is received, control circuitry 26 can automatically open housing 12 so that display 14 is visible and ready for user by the user. Other predetermined criteria may be used to open housing 12, to close housing 12, to place housing 12 in a partly opened condition, or to otherwise adjust the relative position of housing portions such as portions 12A and 12B or other device structures, if desired.

When a user presents a keyboard or other content on display 14, the displayed content may be augmented by forming deformed portions 60 using tactile output device 30. As an example, device 30 may form deformed portions 60 that surround the borders of keys in an on-screen keyboard, may form deformed portions 60 that raise some or all of the keys, or may form other deformed portions 60 on display 14 that serve to delineate the location of selectable on-screen options such as on-screen buttons, keys, drop down menu options, fillable boxes, etc.

Figure 22:
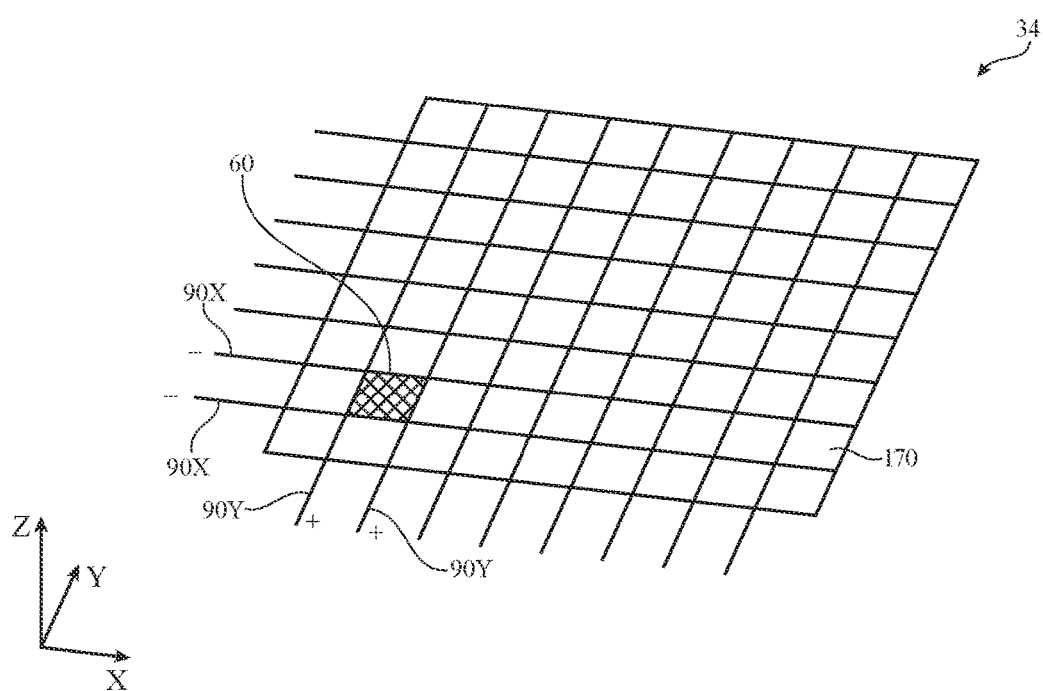
FIG. 22 is a perspective view of an illustrative array of electrodes that may be used in selectively applying electric fields to a deformable layer in accordance with an embodiment.

Transparent conductive electrodes such as indium tin oxide electrodes, metal electrodes, or other electrodes may be used in applying electric fields to electroactive polymer in device 10. For example, metal electrodes or indium tin oxide electrodes may be patterned in a grid of overlapping vertical and horizontal lines of the type shown in FIG. 22. In tactile output device 34 of FIG. 22, electrodes 90 include electrodes 90Y that extend parallel to the Y axis of FIG. 22 and perpendicular electrodes 90X that extend parallel to the X axis of FIG. 22. Electrodes 90X may be formed on one side of electroactive polymer layer 170 and electrodes 90Y may be formed on an opposing side of electroactive polymer layer 170 or electrodes 90X and 90Y may be formed on the same surface of layer 170 and/or may be embedded within layer 170. In the example of FIG. 22, a first signal is being applied to a pair of electrodes 90Y and a second signal that is different than the first signal (e.g., a signal having opposite polarity to the first signal) is being applied to a pair of electrodes 90X, thereby creating an electric field through portion 60 of electroactive polymer layer 170. The applied electric field causes portion 60 of electroactive polymer layer 170 to deform (e.g., expand or contract).

Figure 23:
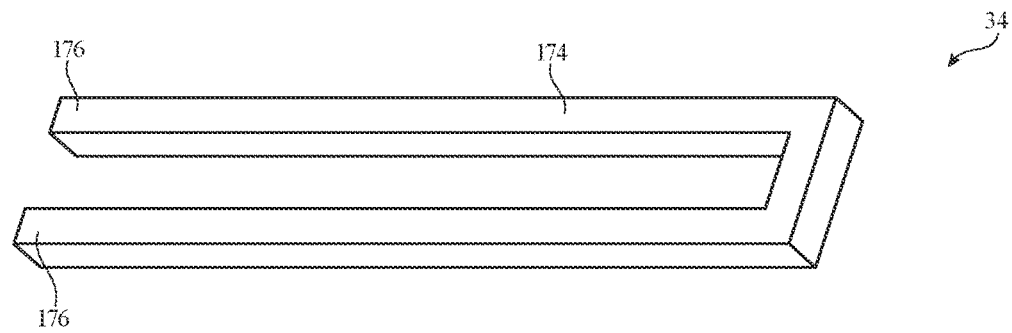
FIG. 23 is a perspective view of an illustrative actuator member formed from a shape memory material in accordance with an embodiment.
Figure 24:
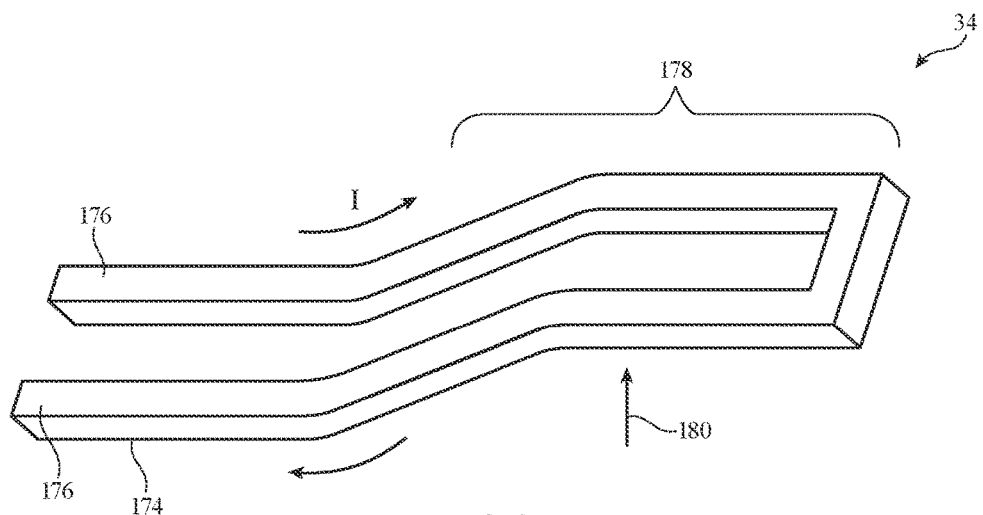
FIG. 24 is a perspective view of the illustrative actuator member of FIG. 23 in a deployed configuration in accordance with an embodiment.

If desired, shape memory alloys such as copper-aluminum-nickel or nickel-titanium (nitinol) or other shape memory metals may be used to form electrically controlled actuators to locally deform tactile output device 34. As an example, an array of shape memory metal structures such as shape memory metal actuator structure 174 of FIG. 23 may be formed under a flexible layer in layers 52. Control circuitry 26 may apply a signal across terminals 176 when it is desired to ohmically heat actuator 174. The heating process activates the shape memory effect in actuators 174 and causes actuator 174 to move upwards in direction 180 as shown in FIG. 24 to deform portion 60 of the flexible layer overlapping actuator 174. The U-shape of actuator 174 of FIGS. 23 and 24 is merely illustrative. Shape memory metal actuator arrays may be formed from any suitable actuator structures The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a housing;
a flexible display mounted in the housing, wherein the flexible display comprises a pixel array, a polymer substrate, and an array of openings that pass at least partially through the polymer substrate, and wherein the pixel array comprises pixels that are located between the openings; and
a tactile output device having electrodes to which signals are applied to deform a portion of the flexible display, wherein the tactile output device deforms localized portions of the pixel array while other portions of the pixel array remain flat.

2. The electronic device defined in claim 1 wherein the electrodes form electromagnets and wherein the tactile output device includes ferromagnetic material that receives magnetic fields from the electromagnets.

3. The electronic device defined in claim 2 wherein the ferromagnetic material comprises a ferrofluid.

4. The electronic device defined in claim 3 wherein the tactile output device has a flexible polymer layer with recesses that receive the ferrofluid.

5. The electronic device defined in claim 2 wherein the ferromagnetic material includes permanent magnet plungers that deform the portion of the flexible display.

6. The electronic device defined in claim 1 wherein the tactile output device comprises electroactive polymer that is deformed upon application of electric fields from the electrodes.

7. The electronic device defined in claim 6 wherein the electroactive polymer forms a layer of material having opposing first and second surfaces and wherein the electrodes include first electrodes that extend along a first dimension on the first surface and second electrodes that extend along a second dimension that is perpendicular to the first dimension on the second surface.

8. The electronic device defined in claim 1 wherein the display comprises an organic light-emitting diode display, wherein the tactile output device comprises an electroactive polymer layer that is overlapped by the organic light-emitting diode display, and wherein the electroactive polymer layer and the overlapping organic light-emitting diode display are deformed in response to application of electric fields to the electroactive polymer layer with the electrodes.

9. The electronic device defined in claim 8 further comprising a touch sensor, wherein the organic light-emitting diode display overlaps the touch sensor.

10. The electronic device defined in claim 1 wherein the tactile output device comprises fluid that deforms the portion of the flexible display when signals are applied to the electrodes.

11. The electronic device defined in claim 10 wherein the tactile output device comprises a layer with openings through which the fluid flows when the signals are applied to the electrodes.

12. An electronic device, comprising:
a housing;
a flexible display mounted in the housing, wherein the flexible display has a mesh-shaped polymer substrate layer having first and second opposing surfaces and through-holes that pass from the first surface to the second surface of the mesh-shaped polymer substrate layer;
an array of light-emitting diodes mounted on the mesh-shaped polymer substrate layer between the through-holes; and
tactile output device components mounted in the through-holes.

13. The electronic device defined in claim 12 wherein the tactile output device components comprise structures that deform the flexible display when signals are applied.

14. The electronic device defined in claim 13 wherein the tactile output device components comprise electroactive polymer.

15. The electronic device defined in claim 14 further comprising a flexible polymer in which the array of light-emitting diodes and tactile output device components are embedded.

16. The electronic device defined in claim 13 wherein the tactile output device components comprise microelectromechanical systems devices.

17. An electronic device, comprising:
a housing;
a tactile output device having a flexible polymer layer and having electrodes to which signals are applied to deform a portion of the flexible polymer layer;
a display mounted in the housing that is overlapped by the tactile output device, wherein the display comprises a pixel array with pixels on a polymer substrate, wherein the polymer substrate has an array of through-holes located between the pixels, and wherein the tactile output device is located between a pair of the pixels in the pixel array;
a touch sensor that overlaps the display; and
a force sensor that measures force applied to the display, wherein the force sensor comprises capacitive force sensor electrodes.

18. The electronic device defined in claim 17 wherein the display comprises a liquid crystal display.

19. The electronic device defined in claim 18 wherein the tactile output device comprises electroactive polymer that is deformed when electric fields are applied to the electroactive polymer using the electrodes.

20. An electronic device, comprising:
- a housing having a first portion and a second portion that rotate relative to each other about an axis, wherein the housing surrounds an interior cavity;
- electrical components mounted in the interior cavity;
- display structures mounted in the first and second portions, wherein the display structures overlap the electrical components and wherein the display structures include an array of pixels, a polymer substrate, and an array of openings between the pixels that pass at least partially through the polymer substrate;
- electroactive polymer that rotates the first and second portions relative to each other.

21. The electronic device defined in claim 20 further comprising control circuitry that applies signals to the electroactive polymer to close the housing by rotating the first and second portions of the housing into a closed position in which the display structures are bent about the axis.

22. The electronic device defined in claim 21 wherein the display structures comprise an organic light-emitting diode display that overlaps the axis and wherein the control circuitry is configured to apply the signals to the electroactive polymer to fold the organic light-emitting diode display along the axis.

* * * * *